US012625466B2

(12) United States Patent
Tu

(10) Patent No.: US 12,625,466 B2
(45) Date of Patent: May 12, 2026

(54) CONSTANT-ENERGY ESCAPEMENT FOR TIMEPIECE

(71) Applicant: ROLEX SA, Geneva (CH)

(72) Inventor: Xuan Mai Tu, Ecublens (CH)

(73) Assignee: ROLEX SA, Geneva (CH)

( * ) Notice: Subject to any disclaimer, the term of this patent is extended or adjusted under 35 U.S.C. 154(b) by 287 days.

(21) Appl. No.: 18/559,785

(22) PCT Filed: May 12, 2022

(86) PCT No.: PCT/EP2022/062883
§ 371 (c)(1),
(2) Date: Nov. 8, 2023

(87) PCT Pub. No.: WO2022/238524
PCT Pub. Date: Nov. 17, 2022

(65) Prior Publication Data

US 2024/0377787 A1 Nov. 14, 2024

(30) Foreign Application Priority Data

May 12, 2021 (CH) .................................... 00542/21

(51) Int. Cl.
*G04B 15/10* (2006.01)
*G04B 15/08* (2006.01)
*G04B 15/14* (2006.01)

(52) U.S. Cl.
CPC ............ *G04B 15/10* (2013.01); *G04B 15/08* (2013.01); *G04B 15/14* (2013.01)

(58) Field of Classification Search
CPC ......... G04B 15/08; G04B 15/10; G04B 15/14
See application file for complete search history.

(56) References Cited

U.S. PATENT DOCUMENTS

| | | | | |
|---|---|---|---|---|
| 194,744 | A | 8/1877 | Thomson | |
| 197,430 | A | 11/1877 | Thomson | |
| 11,112,758 | B2 * | 9/2021 | Tu | G04B 15/08 |

FOREIGN PATENT DOCUMENTS

| | | | |
|---|---|---|---|
| EP | 3153935 | A1 | 4/2017 |
| WO | 2020007619 | A2 | 1/2020 |
| WO | 2022238524 | A1 | 11/2022 |

OTHER PUBLICATIONS

Foreign Communication from a Related Counterpart Application, International Search Report and Written Opinion dated Sep. 12, 2022, International Application No. PCT/EP2022/062883 filed on May 12, 2022.

* cited by examiner

*Primary Examiner* — Edwin A. Leon
*Assistant Examiner* — Jason M Collins
(74) *Attorney, Agent, or Firm* — Conley Rose, P.C.

(57) ABSTRACT

An escapement device for a mechanical timepiece having an escapement wheel cooperating with a rocker and a mobile element, the rocker cooperates with the escapement wheel by blocking arms and with the balance plate by a release fork, the mobile element having a spring cooperating with the teeth of the escapement wheel by a winding arm and with the balance wheel plate by an impulse arm. This space-saving escapement device is able to supply the balance wheel with an almost constant quantity of energy within a variable barrel torque range.

10 Claims, 6 Drawing Sheets

CONSTANT-ENERGY ESCAPEMENT FOR TIMEPIECE

CROSS-REFERENCE TO RELATED APPLICATIONS

The present application is a filing under 35 U.S.C. 371 as the National Stage of International Application No. PCT/EP2022/062883, filed May 12, 2022, entitled "CONSTANT-ENERGY ESCAPEMENT FOR TIMEPIECE," which claims priority to Swiss Application No. 00542/21 filed with the Intellectual Property Office of Switzerland on May 12, 2021, both of which are incorporated herein by reference in their entirety for all purposes.

The present invention relates to a constant energy escapement device for a mechanical timepiece. This escapement device is able to provide the balance with a practically constant amount of energy in a variable torque range of the barrel.

It is known that for the frequency of the mechanical oscillator to be as stable as possible, the amplitude of oscillation of the balance must be as constant as possible. A constant energy escapement device makes it possible to obtain this result in the absence of external disturbances.

Constant energy escapement devices are known.

In the book "clock and watch escapements" by Charles Gros, Watchmakers editions January 2013, pages 349 to 359, several types of constant energy escapements for watches are represented.

These escapements have the following disadvantages:

- a large number of components used, which implies a high manufacturing cost,
- the surface and/or the height of the escapement are large, which complicates the integration of the escapement into a small volume watch.

Patent FR 1 009 853 A describes a constant energy escapement composed of 2 superimposed anchor escapements; the escapement wheels rotate independently around the same axis of rotation and are connected together by a spiral spring (FIG. 3).

Figure 1:
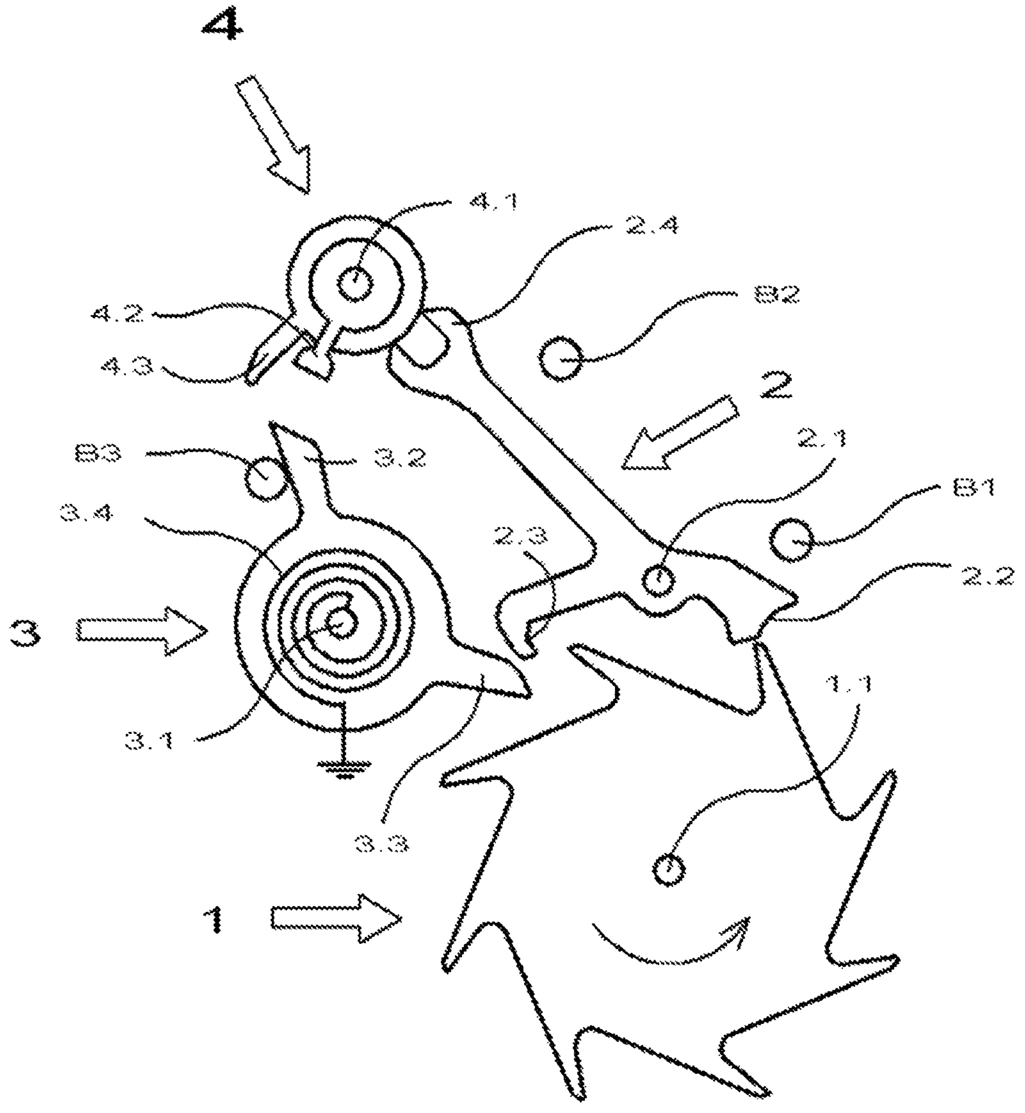

Patent CH 704 764 A2 also describes a constant energy escapement composed of several superimposed wheels rotating around the same axis of rotation (FIG. 1).

The 2 aforementioned patents present the same disadvantages already listed above for the escapements described in Charles Gros' book.

The aim of the present invention is to propose a new type of escapement which makes it possible to deliver to the balance a practically constant energy in a variable torque range of the barrel, this with a limited number of components and in a reduced space requirement.

Another aim of the invention is to propose a mechanical timepiece equipped with such an escapement.

To this end, a first aspect of the invention relates to an escapement device for a mechanical timepiece including:

- an escapement wheel comprising teeth, that is to say a toothed escapement wheel,
- a rocker,
- a mobile element,
- at least one piece forming part of an oscillator of the timepiece, such as a balance plate, the escapement wheel cooperating with the rocker and the mobile element, the rocker cooperating with the escapement wheel by blocking means and with the piece forming part of the oscillator by release means, the mobile element comprising elastic means arranged to store elastic energy, and cooperating with the escapement wheel by winding means and with the piece forming part of the oscillator by impulse means, characterized in that:

- the winding means are arranged to carry out a phase of winding the elastic means along a first direction of rotation of the balance and the impulse means are arranged to carry out an impulse phase given by the mobile element to the piece forming part of the oscillator during the rotation of the balance along at least a second direction of rotation of the balance, and in that:

- the impulse is given directly from the mobile element to the piece forming part of the oscillator, particularly without passing through an intermediate element.

According to the embodiment above, the winding means are arranged to wind the elastic means of the mobile element, that is to say transmit energy from the escapement wheel (meshed with the reserve of energy of the timepiece, the barrel and its spring) to the mobile element and its elastic means. The impulse means are for their part designed to distribute or restore the energy (stored by the elastic means) from the mobile element to the piece forming part of the oscillator (the balance plate). Consequently, the rocker does not directly participate in maintaining the oscillations of the oscillating system (the balance). Also, it can be noted that the energy transmitted to the balance is the one stored by the elastic means of the mobile element, and this energy only depends on the winding of the elastic means of the mobile element, it is therefore constant and does not depend on the winding of the barrel spring.

Particularly, a phase of winding the elastic means can correspond to a first direction of rotation of the balance and an impulse phase given by the mobile element to the piece forming part of the oscillator can correspond to a second direction of rotation of the balance.

In addition, it can be considered that the winding phase is carried out under the effect of the rotation of the balance.

According to one embodiment, the mobile element is designed to move between a rest position and a wound position. Particularly, the mobile element is designed to be moved from the rest position to the wound position by the escapement wheel. This displacement of the mobile element caused (preferably directly) by the escapement wheel makes it possible to wind the elastic means that is to say to make them store energy. Moreover, the mobile element is designed to be moved from the wound position to the rest position by the action of the elastic means. This displacement of the mobile element caused by the elastic means makes it possible to move the mobile element and simultaneously give an impulse (transmit energy) to the balance plate. It can be noted that the amount of energy received and stored by the elastic means during the displacement of the mobile element between the rest position and the wound position is always the same, whatever the torque applied by the barrel to the escapement wheel.

According to one embodiment, the mobile element is held in the rest position and/or in the wound position by a mechanical stop. It can be planned that the mechanical stop holding the mobile element in the wound position is retractable. It can be planned that the mechanical stop holding the mobile element in the wound position is a portion of the escapement wheel, particularly a tooth of the escapement wheel.

According to one embodiment, a first blocking (or rest) position of the rocker after the spring winding phase is different from a blocking (or rest) position of the rocker after the impulse phase given by the mobile element to the piece forming part of the oscillator.

According to one embodiment, the mobile element is blocked by a tooth of the escapement wheel after the phase of winding the elastic means.

According to one embodiment, the impulse means comprise:

- at least one finger or lever protruding from the piece forming part of the oscillator, and/or
- at least one arm protruding from the mobile element. The impulse means are shared or distributed between the mobile element and the piece forming part of the oscillator: the rocker does not participate directly in this function.

According to one embodiment, the winding means comprise:

- at least one tooth of the escapement wheel, and/or
- at least one winding arm of the mobile element. The winding means are shared or distributed between the escapement wheel and the mobile element: the rocker does not directly participate in this function.

According to one embodiment, the blocking means comprise:

- at least two arms of the rocker, and/or
- at least one tooth of the escapement wheel. The blocking means are shared or distributed between the rocker and the escapement wheel: the mobile element does not participate in this function.

According to one embodiment, the release means comprise:

- at least one fork of the rocker, and/or
- at least one finger or lever of the piece forming part of the oscillator. The release means are shared or distributed between the rocker and the piece forming part of the oscillator (the balance plate): the mobile element does not participate in this function.

According to one embodiment, the piece forming part of the oscillator comprises a double lift able to receive energy coming from the mobile element in both directions of rotation of the balance.

According to one embodiment, the elastic means of the mobile element are formed by a spiral type spring.

According to one embodiment, the elastic means of the mobile element are formed by a leaf spring.

According to one embodiment, the elastic means of the mobile element are formed by leaf springs, so as to form a flexible guiding system that does not have or does not present a physical axis of rotation. According to this embodiment, the mobile element comprises a static part and a mobile element part connected to the static part by flexible leaves which authorize a movement of the mobile element part, and particularly a rotational movement of the mobile element part without any rotation shaft no relative sliding or pivoting with friction: a virtual axis of rotation is thus generated.

In summary, it can be noted that the elastic means of the mobile element can be:

- a spiral spring, a leaf spring, with the mobile element pivoting on a shaft or a physical axis of rotation,
- one or more spring leaves or levers working by bending to authorize a movement of a free movable part facing a fixed part, and preferably to authorize a rotational movement of a free movable part around a virtual axis of rotation facing a fixed part.

According to one embodiment, the piece forming part of the oscillator is a balance plate.

According to one embodiment, the rocker can cooperate with a first piece forming part of the oscillator (typically a balance plate) or with a first part of a piece forming part of the oscillator (typically a first part of the balance plate), and the mobile element can cooperate with a second piece forming part of the oscillator or with a second part of a piece forming part of the oscillator (typically a second part of the balance plate).

In other words, the invention can relate to an escapement device for a mechanical timepiece including:

- a toothed escapement wheel or an escapement wheel comprising teeth,
- a rocker,
- a mobile element,
- at least one piece forming part of an oscillator of the timepiece, such as a balance plate, the escapement wheel cooperating with the rocker and the mobile element, the rocker cooperating with the escapement wheel by blocking means and with the piece forming part of the oscillator by release means, characterized in that:

the mobile element comprises elastic means arranged to store elastic energy, and cooperates with the escapement wheel by winding means and with the piece forming part of the oscillator by impulse means, in which:

- the winding means are arranged to carry out a phase of winding the elastic means during the rotation of the balance along a first direction of rotation of the balance and the impulse means are arranged to carry out an impulse phase given by the mobile element to the piece forming part of the oscillator during the rotation of the balance along at least a second direction of rotation of the balance, and in which:

- the impulse is given directly from the mobile element to the piece forming part of the oscillator.

In other words, the invention can relate to an escapement device for a mechanical timepiece including:

- a toothed escapement wheel or an escapement wheel comprising teeth,
- a rocker,
- a mobile element,
- at least one piece forming part of an oscillator of the timepiece, such as a balance plate, the escapement wheel cooperating with the rocker and the mobile element, the rocker cooperating with the escapement wheel by blocking means and with the piece forming part of the oscillator by release means, characterized in that:

the mobile element comprises elastic means arranged to store elastic energy, and cooperates:

with the escapement wheel by winding means arranged to transmit energy from the escapement wheel to the mobile element, to be stored by the elastic means, and with the piece forming part of the oscillator by impulse means arranged to transmit the energy stored by the elastic means, from the mobile element to the piece forming part of the oscillator, in which:

- the winding means are arranged to carry out a phase of winding the elastic means during the rotation of the balance along a first direction of rotation of the balance and the impulse means are arranged to carry out an impulse phase given by the mobile element to the piece forming part of the oscillator during the rotation of the balance along at least a second direction of rotation of the balance, and in which:

the impulse is given directly from the mobile element to the piece forming part of the oscillator.

Another aspect of the invention relates to a timepiece provided with an escapement device according to the first aspect.

Figure 2A:
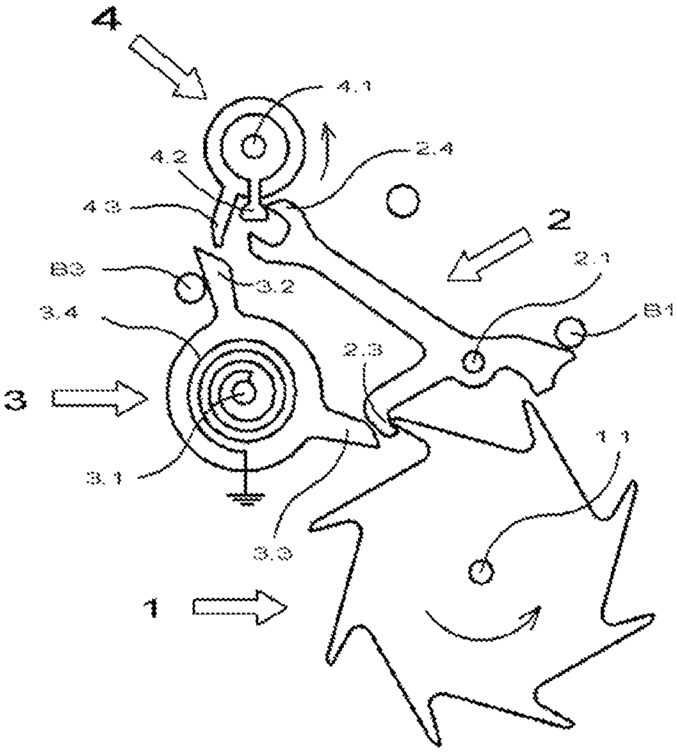
Figure 2B:
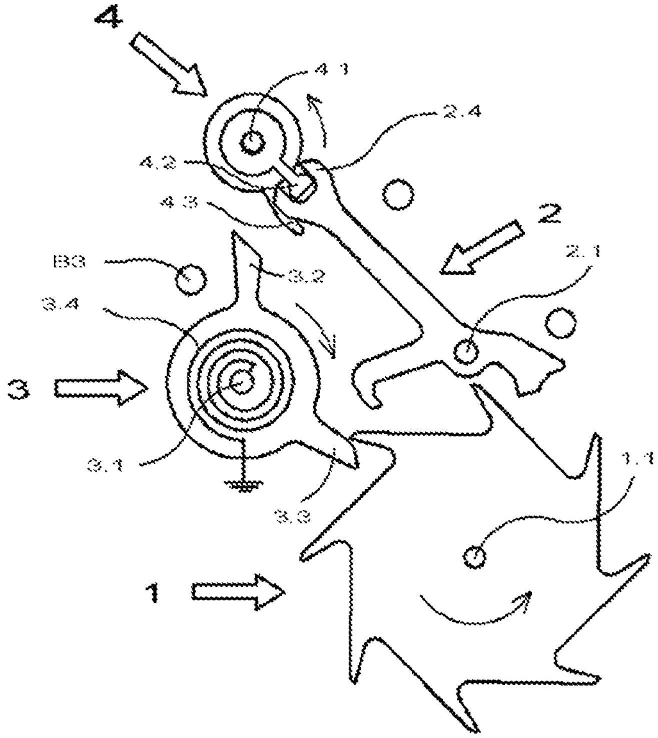
Figure 2C:
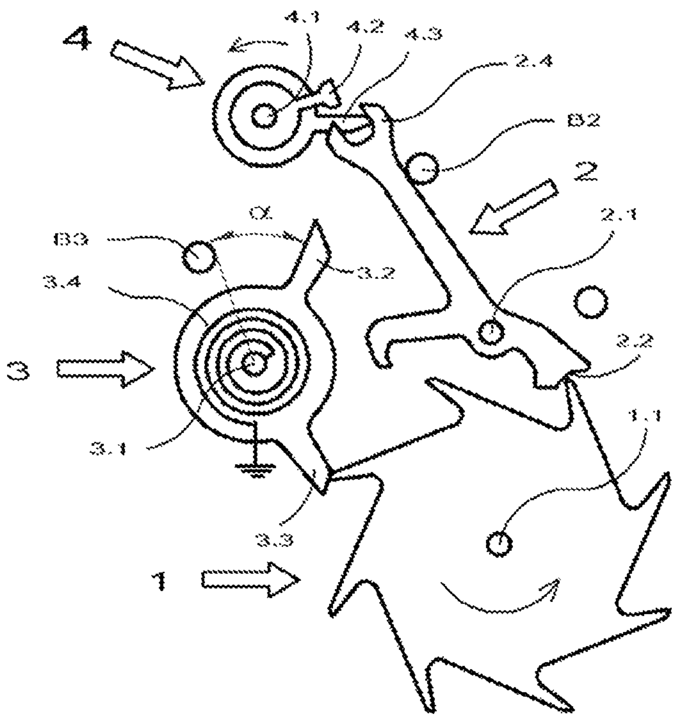
Figure 3A:
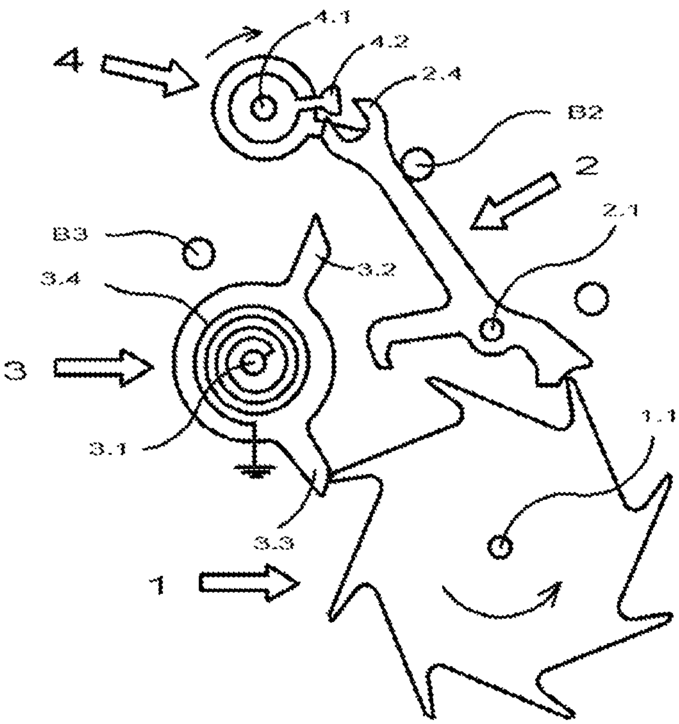
Figure 3B:
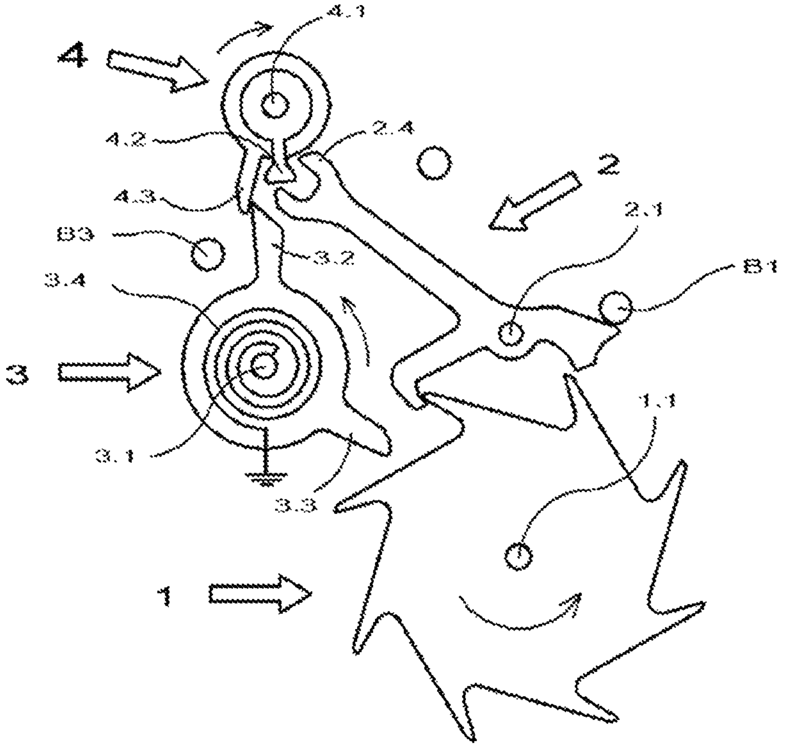
Figure 3C:
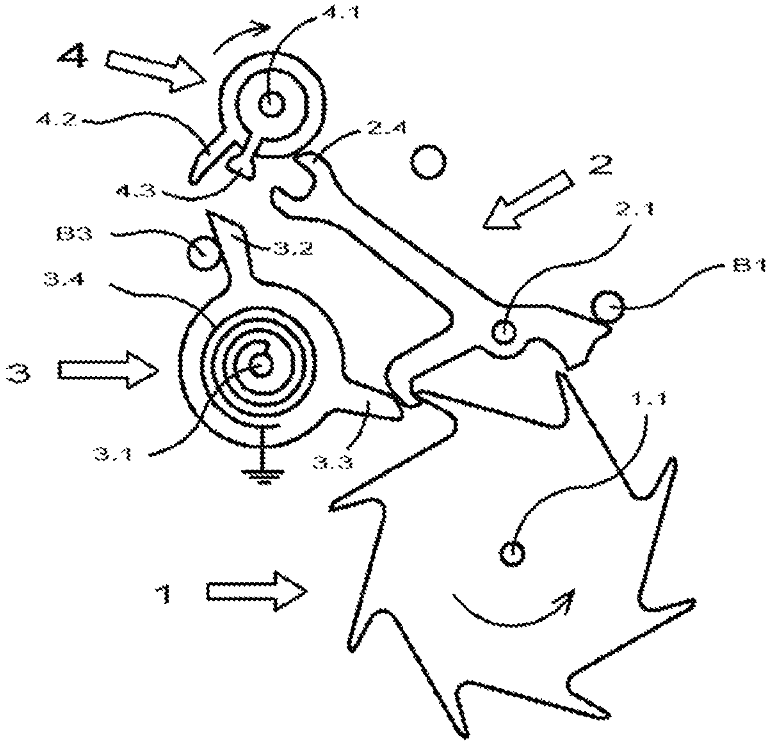
Figure 4A:
Figure 4B:
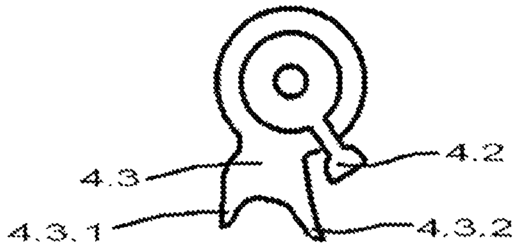
Figure 4C:
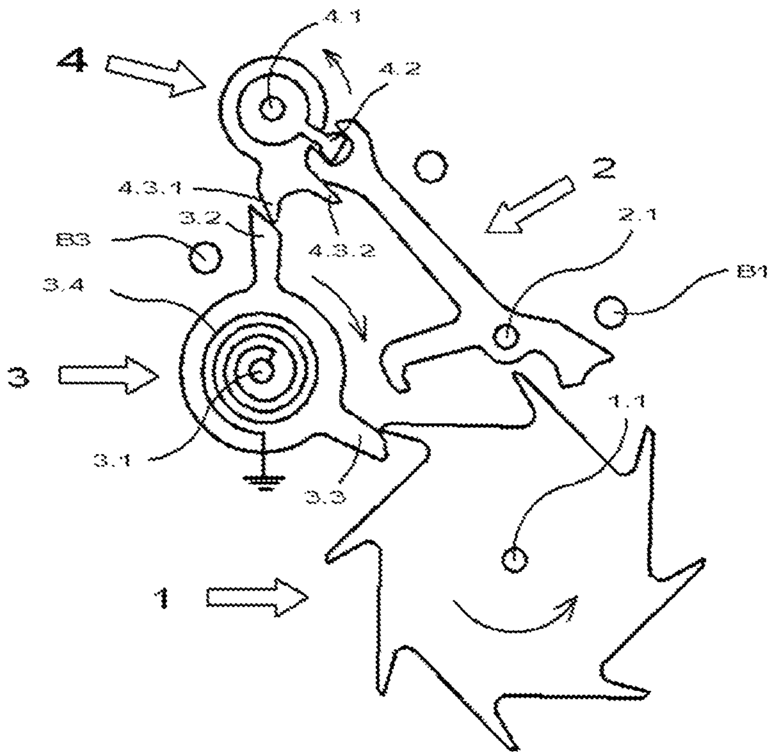
Figure 5:
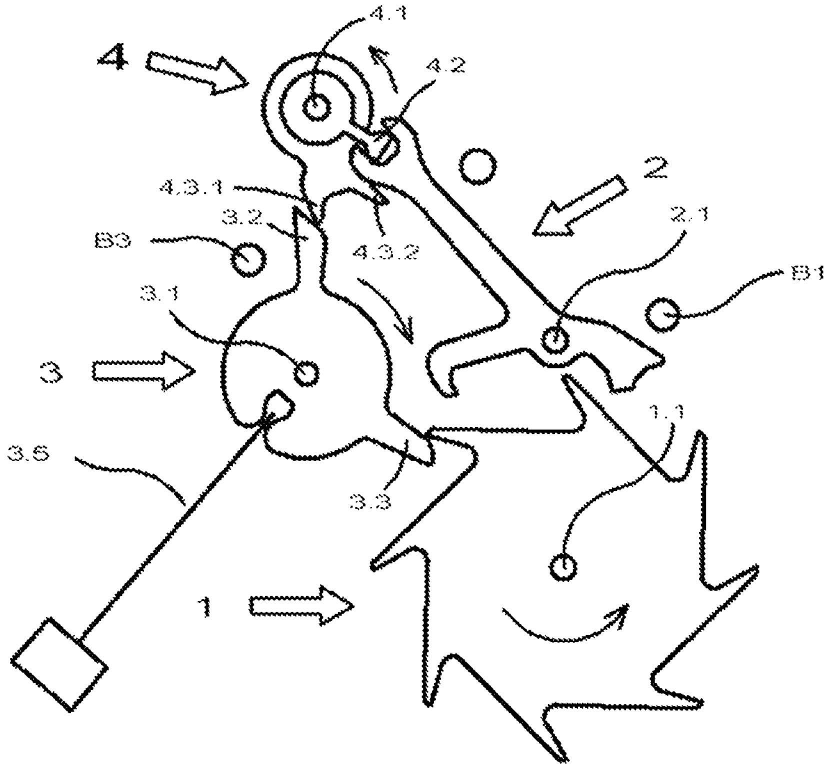
Figure 6:
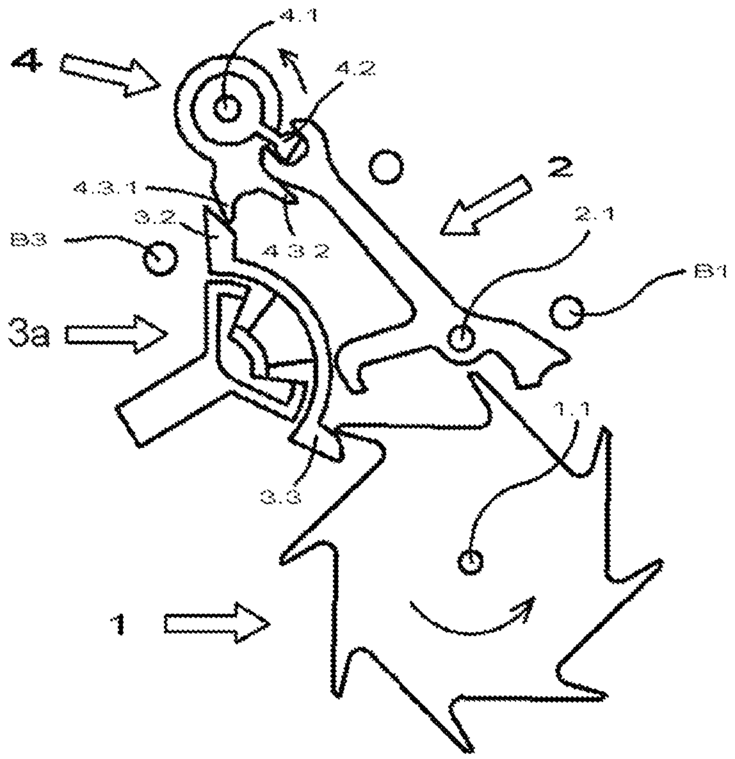

The characteristics and advantages of the invention will emerge from the following description, with reference to the appended drawings in which:

FIG. 1 represents a form of execution of the escapement device according to the invention, FIG. 2*a* represents the first blocking position of the escapement device of FIG. 1, FIG. 2*b* represents the situation of the escapement device of FIG. 1 after the disengagement when the balance rotates in a first direction of rotation, particularly the counterclockwise direction, FIG. 2*c* represents the second blocking position of the escapement device of FIG. 1 while the balance rotates in the first direction of rotation, FIG. 3*a* represents the second blocking position of the escapement device of FIG. 1 while the balance rotates in a second direction of rotation, particularly the clockwise direction, FIG. 3*b* represents the situation of the escapement device of FIG. 1 after the disengagement when the balance rotates in the second direction of rotation, FIG. 3*c* represents the position of the different mobile elements of the escapement device of FIG. 1 after the impulse given by the mobile element 3 to the balance plate, FIG. 4*a* represents the balance plate of the escapement of FIG. 1, FIG. 4*b* represents an alternative execution of the balance plate of the escapement of FIG. 1, FIG. 4*c* represents the phase of winding of the spring 3.4 with the alternative execution of the balance plate of FIG. 4*b*, FIG. 5 represents a second alternative execution of the escapement according to the invention, FIG. 6 represents a third alternative execution of the escapement according to the invention.

A form of execution of the escapement device according to the invention is represented in FIG. 1. The escapement device according to FIG. 1 comprises:

- an escapement wheel 1 comprising teeth 1.2 forming part of the winding means, driven by the barrel through transmission or finishing wheels not represented; this escapement wheel 1 rotates around an axis 1.1 in the counterclockwise direction.
- a rocker 2 pivoting around an axis 2.1, including blocking means and release means. The movement of this rocker is limited by limitation stops B1 and B2,
- a mobile element 3 pivoting around an axis 3.1, including a spring 3.4 mounted between a static part of the timepiece and the mobile element 3, a first impulse arm 3.2 forming part of impulse means and a second winding arm 3.3 forming part of the winding means mentioned above. The movement of this mobile element 3 is limited by a limitation stop B3.

In the represented example, the rocker 2 can have the general shape of an asymmetrical anchor equipped with a rod ending with a fork 2.4. The blocking means can correspond to the two arms 2.2 and 2.3 of the anchor or form part of the two arms of the anchor (attached pallets can also be provided), while the release means can correspond to the fork 2.4 or particularly to horns of the fork 2.4.

In the present application, with regard to the balance plate 4, it is considered to be comprised in the escapement system, although in some documents does not directly form part of the escapement device. Consequently, the balance plate 4 is also represented in FIG. 1. This balance plate 4 pivots around an axis 4.1 and comprises release means (here in the form of a finger or a lever 4.2) and energy receiving means 4.3, these energy receiving means 4.3 forming part of the impulse means mentioned above. In the example represented, the release means can be a finger or a lever 4.2, a finger or a lever protruding from the periphery of the balance plate 4 and the energy receiving means 4.3 forming part of the impulse means can form another finger or another lever protruding from the periphery of the balance plate 4. As a side note, this roller 4 also forms part of an oscillator device of the timepiece, particularly of a sprung-balance assembly of the timepiece.

The following figures describe the main operating steps of the escapement device according to the invention.

FIGS. 2*a* to 2*c* represent the different steps of the phase of winding or providing elastic potential energy to the spring 3.4 of the mobile element 3 by the escapement wheel.

FIG. 2*a* represents a first blocking position of the escapement device of FIG. 1. In this position, a tooth of the escapement wheel rests on the blocking means (the arm 2.3 of the rocker 2) and the movement of the rocker is limited by the stop B1. The impulse arm 3.2 of the mobile element 3 rests on the stop B3 under the effect of the return torque of the spring 3.4. The balance 4, which rotates in a first direction of rotation, in this case the counterclockwise direction in FIG. 2*a*, is in the position just before the disengagement.

FIG. 2*b* represents the situation after the disengagement. Under the effect of the torque of the escapement wheel 1, the mobile element 3 rotates in the clockwise direction and provides elastic potential energy to the spring 3.4. It is noted that in this example of execution, the arm 3.2 does not come into contact with the balance plate 4 during the winding of the spring 3.4.

FIG. 2*c* represents a second blocking position of the escapement device of FIG. 1. In this position, a tooth of the escapement wheel 1 rests on the blocking means (the arm 2.2 of the rocker 2) and the movement of the rocker is limited by the stop B2. The arm 3.3 of the mobile element 3 is blocked by another tooth of the escapement wheel 1. Between the two blocking positions, the mobile element 3 is moved by an angle □, and the energy provided by the escapement wheel to the spring 3.4 is:

$$E = 1/2 \cdot k \cdot □^2$$

k being the constant of the spring.

FIGS. 3*a* to 3*c* represent the different steps of the energy transmission phase from the spring 3.4 to the balance.

FIG. 3*a* represents (like FIG. 2*c*) the second blocking position of the escapement device of FIG. 1. However, unlike FIG. 2*c*, the balance plate 4 rotates in a second direction of rotation, in this case the clockwise direction, and is in the position just before the disengagement.

FIG. 3*b* represents the situation after the disengagement. The rocker 2 moves from the second blocking position to the first blocking position, thus releasing the escapement wheel 1 and the arm 3.3 of the mobile element 3. The arm 3.2 of the mobile element 3, under the effect of the torque of the spring 3.4, gives the impulse to the energy receiving means 4.3 of the balance plate 4, it is noted that this impulse is of the direct type, that is to say that the arm 3.2 directly transmits the torque to the balance plate 4 without passing through an intermediate element.

FIG. 3*c* represents the position of the different mobile elements of the escapement device after the impulse phase given by the mobile element 3 to the balance plate 4.

The balance therefore always receives the same amount of energy coming from the spring 3.4 to the nearest transmission efficiency, if the torque of the escapement wheel is greater than or equal to the torque of the spring 3.4. In other words, the impulse energy is transmitted directly by the spring 3.4, and not by the rocker 2 (the anchor).

It is observed that the desired aim has been achieved: the escapement device according to the invention makes it possible to provide the balance with a practically constant amount of energy in a variable torque range of the barrel. The device according to the invention requires few components compared to the devices known to the prior art, moreover its space requirement is very small, which makes it possible to easily integrate it into a small-volume timepiece.

FIGS. 4*b* and 4*c* represent alternative executions of the escapement according to the invention.

FIG. 4*a* represents the balance plate 4 of the escapement of FIG. 1, which is provided with release means (the finger or the lever 4.2) and energy receiving means (the finger or the lever 4.3), which as explained respectively take the form of a finger or a lever protruding from the periphery of the balance plate 4.

In FIGS. 4*b* and 4*c*, the energy receiving means of the balance plate 4 comprises two fingers or levers 4.3.1. and 4.3.2, thus forming "a double lift". The disengaging receiving means for their part remain unchanged and take the form of a finger or a lever t 4.2, of a finger or a lever protruding from the periphery of the balance plate 4.

FIG. 2*b* shows that during the phase of winding the spring 3.4, the arm 3.2 does not come into contact with the balance plate 4. Given the low inertia of the mobile element 3, the movement of the escapement wheel 1 during the phase of winding the spring 3.4 can be faster than that of the rocker 2 which is meshed with the balance plate 4. This desynchronization can cause the instability of the escapement device when it is positioned in the second blocking position.

To synchronize the movement of the escapement wheel 1 with that of the rocker 2, the balance plate 4 represented in FIG. 4*b* can be advantageously used. In this alternative execution, the first finger or lever 4.3.1 comes into contact with the arm 3.2 of the mobile element 3 during the phase of winding the spring 3.4, namely during the rotation of the balance in a first direction of rotation. The second finger or lever 4.3.2 is used to receive energy from the spring after the disengagement when the balance rotates in a second direction of rotation.

FIG. 4*c* represents the escapement device according to the invention during the phase of winding the spring 3.4 with the new variant of the balance plate 4.

FIG. 5 represents a second alternative execution of the escapement according to the invention.

In this new execution, the spiral spring 3.4 is replaced by a leaf spring 3.5 engaged in a slot in the mobile element 3.

FIG. 6 represents a third alternative execution of the escapement according to the invention.

In this third alternative execution, the mobile element 3 pivoted on the axis 3.1 of the previous figures is replaced by a flexible guiding system 3*a* which does not have a physical axis of rotation. Indeed, the arms 3.2 and 3.3 of the mobile element 3 are connected to a static part of the timepiece by leaf springs which authorize the winding and impulsion phases described above.

It will be understood that various modifications and/or improvements obvious to those skilled in the art can be made to the different embodiments of the invention described in the present description without departing from the scope of the invention defined by the appended claims.

Particularly, the rocker can have any shape and is not limited to an anchor.

Finally, the mobile element can give the impulse to any part of the balance or even to another piece forming part of the oscillator, and not necessarily to a finger or a lever formed on the balance plate. For example, toothed sectors or portions can be provided.

In other words, the impulse means can be designed to give the impulse from the mobile element to a (preferably oscillating) piece of the oscillator, such as the balance or the balance plate.

The invention claimed is:

1. An escapement device for a mechanical timepiece including:

an escapement wheel comprising teeth, a rocker, a mobile element, at least one piece forming part of an oscillator of the timepiece, the escapement wheel cooperating with the rocker and the mobile element, the rocker cooperating with the escapement wheel by blocking means and with the piece forming part of the oscillator by release means, the mobile element comprising elastic means arranged to store elastic energy, and cooperating with the escapement wheel by winding means and with the piece forming part of the oscillator by impulse means, characterized in that:

the winding means are arranged to carry out a phase of winding the elastic means along a first direction of rotation of the piece forming part of an oscillator and the impulse means are arranged to carry out an impulse phase given by the mobile element to the piece forming part of the oscillator during the rotation of the piece forming part of an oscillator along at least a second direction of rotation of the piece forming part of an oscillator, and in that:

the impulse is given directly from the mobile element to the piece forming part of the oscillator, the piece forming part of the oscillator comprises two fingers or levers forming a double lift able to receive energy coming from the mobile element in both directions of rotation of the piece forming part of an oscillator.

2. The escapement device according to claim 1 characterized in that a first blocking position of the rocker after the phase of winding the elastic means is different from a second blocking position of the rocker after the impulse phase given by the mobile element to the piece forming part of the oscillator.

3. The escapement device according to claim 1 characterized in that the mobile element is blocked by a tooth of the escapement wheel after the phase of winding the elastic means.

4. The escapement device according to claim 1, characterized in that the impulse means comprise:

at least one finger or lever protruding from the piece forming part of the oscillator, and/or—at least one impulse arm protruding from the mobile element.

5. The escapement device according to claim 1, characterized in that the winding means comprise:

at least one tooth of the escapement wheel, and/or—at least one winding arm of the mobile element.

6. The escapement device according to claim 1, characterized in that the elastic means of the mobile element are formed by a spiral type spring.

7. The escapement device according to claim 1, characterized in that the elastic means of the mobile element are formed by a leaf spring.

8. The escapement device according to claim 1, characterized in that the elastic means of the mobile element are formed by leaf springs, so as to form a flexible guiding system without any physical axis of rotation.

9. The escapement device according to claim 1, characterized in that the piece forming part of the oscillator is a balance plate.

10. A timepiece provided with an escapement device according to claim 1.

* * * * *